United States Patent
Burkland et al.

(10) Patent No.: US 7,865,754 B2
(45) Date of Patent: Jan. 4, 2011

(54) POWER BUDGET MANAGEMENT IN POWER OVER ETHERNET SYSTEMS

(75) Inventors: William Andrew Burkland, Huxley, IA (US); Douglas Paul Anderson, Nevada, IA (US)

(73) Assignee: Micrel, Inc., San Jose, CA (US)

( * ) Notice: Subject to any disclaimer, the term of this patent is extended or adjusted under 35 U.S.C. 154(b) by 763 days.

(21) Appl. No.: 11/865,966

(22) Filed: Oct. 2, 2007

(65) Prior Publication Data

US 2009/0055672 A1      Feb. 26, 2009

Related U.S. Application Data

(60) Provisional application No. 60/957,948, filed on Aug. 24, 2007.

(51) Int. Cl.
*G06F 1/00* (2006.01)
(52) U.S. Cl. .................... 713/340; 713/300; 326/9
(58) Field of Classification Search ............ 713/300, 713/324; 326/9, 35
See application file for complete search history.

(56) References Cited

U.S. PATENT DOCUMENTS

| | | | |
|---|---|---|---|
| 6,701,443 B1 | 3/2004 | Bell | |
| 7,155,622 B2 * | 12/2006 | Mancey et al. | 713/324 |
| 7,170,194 B2 * | 1/2007 | Korcharz et al. | 307/21 |
| 7,203,849 B2 * | 4/2007 | Dove | 713/300 |
| 7,631,201 B2 * | 12/2009 | Hansalia | 713/300 |
| 2004/0201931 A1 | 10/2004 | Korcharz et al. | |
| 2004/0230846 A1 | 11/2004 | Mancey et al. | |
| 2005/0272402 A1 | 12/2005 | Ferentz et al. | |
| 2006/0112285 A1 | 5/2006 | Stineman, Jr. | |
| 2006/0164773 A1 * | 7/2006 | Stanford et al. | 361/93.1 |

* cited by examiner

*Primary Examiner*—Chun Cao
(74) *Attorney, Agent, or Firm*—Patent Law Group LLP; Carmen C. Cook

(57) ABSTRACT

A power budget monitoring circuit in a multi-port PSE includes a differential amplifier and a transistor for setting a reference voltage across a first resistor to establish a reference current, multiple current mirror output devices each associated with a power port of the PSE, a second resistor and a comparator. Each current mirror output device provides an output current indicative of the power demanded by the associated power port where the output currents are summed at a second node into a monitor current. The second resistor has a resistance value proportional to a maximum power budget of the PSE and receives the monitor current. A monitor voltage develops across the second resistor indicative of the total power demanded by the power ports. The comparator compares the monitor voltage to the reference voltage and provides a comparator output signal indicating whether the maximum power budget of the PSE has been exceeded.

19 Claims, 3 Drawing Sheets

POWER BUDGET MANAGEMENT IN POWER OVER ETHERNET SYSTEMS

CROSS-REFERENCE TO RELATED APPLICATION

This application claims the benefit of U.S. Provisional Patent Application Ser. No. 60/957,948, filed on Aug. 24, 2007, having the same inventorship hereof, which application is incorporated herein by reference in its entirety.

FIELD OF THE INVENTION

The invention relates to a power budget management scheme in Power over Ethernet (PoE) systems and, in particular, to a power budget management scheme for a multi-port power sourcing equipment in PoE systems.

DESCRIPTION OF THE RELATED ART

Power Over Ethernet (PoE) technology has been developed to allow user devices, such as IP telephones, wireless LAN Access Points and other appliances, to receive power as well as data over existing network cabling, without needing to modify the existing Ethernet infrastructure. Electrical systems that distribute power over Ethernet cabling are described and defined by IEEE Standard 802.3-2005, Clause 33.

In general, a PoE network is formed by a Power Sourcing Equipment (PSE) supplying power and a Powered Device (PD) receiving and utilizing the power. A PSE, which can be an endspan or a midspan network device, injects power onto the designated twisted wire pair of the Ethernet cables forming the local area network. At the other end of the cables, the power is used to run the Powered Devices so that no additional source of power needs to be provided to the Powered Devices. The Power Sourcing Equipment thereby provides on the same Ethernet cable both power and data signals to the Powered Devices.

In some applications, a PSE is a multi-port network device supplying power to a number of Powered Devices. In that case, the total power demanded by the PDs is usually monitored to ensure the demand does not exceed the available power. The PSE is typically formed as part of a managed power system where the managed power system must act to ensure that as new or increased loads are brought online, the total power demanded will not exceed the available power. The managed power system can be implemented using a central host controller and a digital communication bus where information about the new loads is factored into the total power budget and decisions are made whether to power the new load or not. Alternately, the managed power system can include multiple controllers for each port of the PSE where the controller for each port performs the power comparison and controls the activation of the associated port.

SUMMARY OF THE INVENTION

According to one embodiment of the present invention, a power budget monitoring circuit in a multi-port power sourcing equipment (PSE) for a Power over Ethernet system includes a differential amplifier having an inverting input terminal coupled to receive a reference voltage, an non-inverting input terminal coupled to a first node and an output terminal; a first transistor having a control terminal coupled to the output terminal of the differential amplifier, a first current handling terminal coupled to an input terminal of a current mirror and a second current handling terminal coupled to the first node; a first resistor coupled between the first node and a ground voltage and having a first resistance value. The differential amplifier and the first transistor force a voltage equaling the reference voltage across the first resistor to establish a reference current as a function of the reference voltage across the first resistor and the first resistance of the first resistor where the reference current is indicative of a current value per unit power and is provided to a current mirror input device of the current mirror. The power budget monitoring circuit further includes multiple current mirror output devices in the current mirror functioning as variable current sources, each current mirror output device being associated with a power port of the PSE. Each current mirror output device provides an output current indicative of the power demanded by the associated power port and the output currents from the current mirror output devices is summed at a second node into a monitor current.

The power budget monitoring circuit also includes a second resistor coupled between the second node and the ground voltage and having a second resistance value proportional to a maximum power budget of the PSE where the second resistor receives the monitor current and a monitor voltage develops across the second resistor which is indicative of a total power demanded by the power ports of the PSE; and a comparator comparing the monitor voltage to the reference voltage. The comparator provides a comparator output signal having a first state indicating that the total power demanded by the power ports does not exceed the maximum power budget of the PSE and a second state indicating that the total power demanded by the power ports has exceeded the maximum power budget of the PSE.

According to another aspect of the present invention, a Power over Ethernet system includes first and second PSEs where each PSE includes a power budget monitoring circuit. Each PSE includes a first resistor to establish the reference current. All the PSEs couple their monitor current to a single second resistor where a monitor voltage is developed indicative of the total power demand on the PoE system.

The present invention is better understood upon consideration of the detailed description below and the accompanying drawings.

DETAILED DESCRIPTION OF THE PREFERRED EMBODIMENTS

In accordance with the principles of the present invention, a power budget management scheme for a multi-port power sourcing equipment (PSE) in a Power over Ethernet (PoE) system uses a first resistor to set a current indicative of a unit power and a second resistor to set a current indicative of a maximum power load that can be supplied from the PSE.

Analog circuitry is used to establish the total power budget, to indicate the current maximum power load on the PoE system and to determine whether additional loads can be added while keeping the system within a predetermined budget. Furthermore, the power budget management scheme of the present invention implements a multi-port monitoring configuration where one comparator is used to measure the total power budget of two or more power ports of the PSE. In this manner, the power budget management scheme can be realized with minimal circuitry for supporting a PSE with a large number of power ports.

In the present description, the management and monitoring of the power budget of a PSE is described. However, one of ordinary skill in the art would appreciate that management and monitoring of the power budget is synonymous with management and monitoring of the current budget in a system operating at a constant voltage level. It is understood that power (P) of a system is given as the product of voltage (V) applied to and the current (I) drawn by the system, that is P=VI. Therefore, for a system operating at a fixed supply voltage level, the current drawn is directly proportional to the power consumed. Therefore, the power budget management scheme of the present invention is equally applicable for the management and monitoring of a current budget. The use of the term "power budget" with reference to the management scheme and monitoring circuit of the present invention is not intended to be limiting. The power budget management scheme and power budget monitoring circuit of the present invention can be applied for current budget management and monitoring in a PSE.

Figure 1:
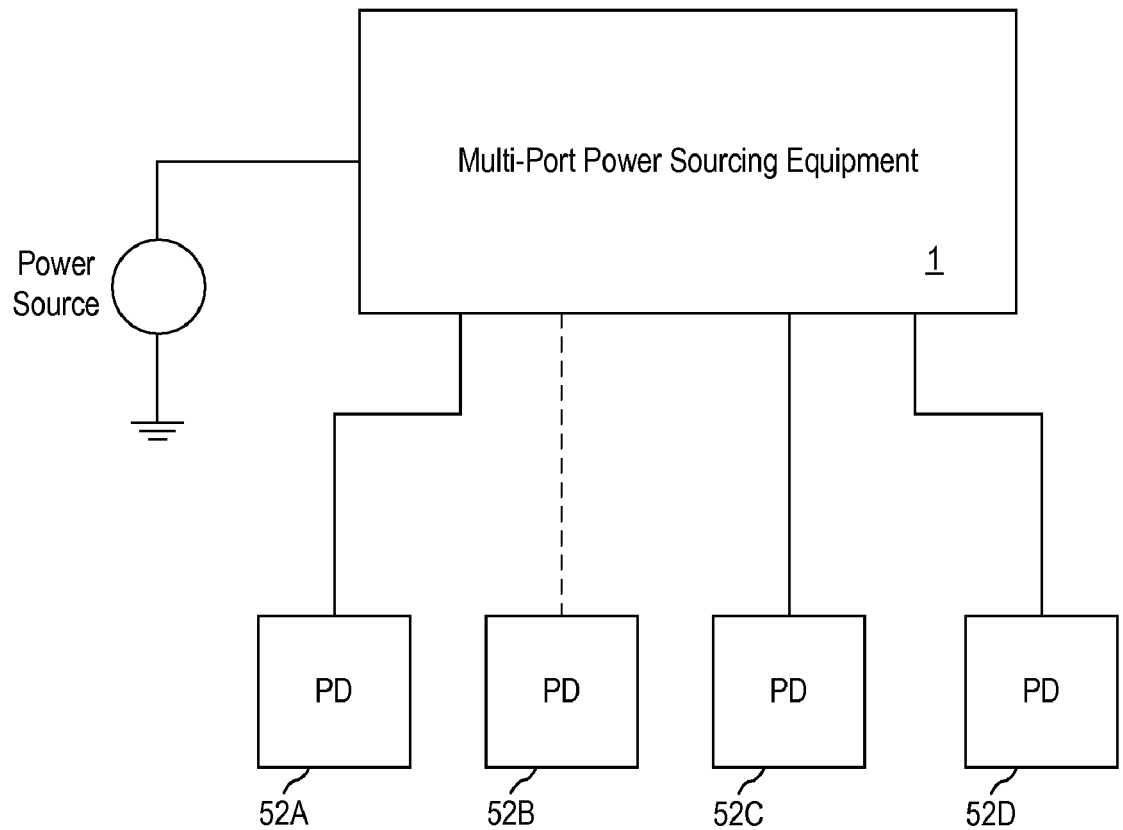
FIG. 1 is a block diagram of a PoE system in which the power budget management scheme of the present invention is implemented.

FIG. 1 is a block diagram of a PoE system in which the power budget management scheme of the present invention is implemented. Referring to FIG. 1, a multi-port PSE device 1 is coupled to a power source providing a source of supply power. The power source can be an AC power source or a DC power source. In the case of an AC power source, an AC-to-DC converter is included in PSE 1 to convert the AC power to DC power for distribution to the power ports. PSE 1 includes multiple power ports for providing power to one or more Powered Devices (PDs). In the present illustration, PSE 1 includes 4 power ports for supporting up to four PDs 52A-D. In the present description, a power port of a PSE refers to a port of the PSE that supplies at least power to a network device connected thereto. The power is provided on a twisted wire pair of an Ethernet cable separate from the twisted wire pair carrying the data signals or on the same twisted wire pair that also carry the data signals.

As each powered device 52A-D is connected to PSE 1 or as each powered device connected to PSE 1 demands power from the PSE, PSE 1 must determine if the total power demand is within its allowable power budget. The allowable power budget refers to the maximum power that the PSE is capable of supplying to the connected PDs. For instance, assuming that PSE 1 is already connected to and providing power for powered devices 52A, 52C and 52D, when powered device 52B initiates a power request from PSE 1, PSE 1 must determine whether it has sufficient power to supply powered device 52B, in addition to the power it is already supplying to powered devices 52A, 52C and 52D. PSE 1 will either supply power to powered device 52B if the total power budget is not exceeded or deny power to powered device 52B if the total power budget is exceeded.

In accordance with the power budget management scheme of the present invention, a PSE incorporates a power budget monitoring circuit to monitor the total power demand from all the power ports of the PSE. The power budget monitoring circuit generates an output signal denoted OverBudget to indicate if the power demand exceeds the allowable power budget. In one embodiment, the power budget monitoring circuit makes the power availability determination based on the classification of powered device requesting power. Under the IEEE standard 802.3-2005, Clause 33, powered devices are divided in classes based on their maximum power consumption. Therefore, based on the classification of the powered device connected to the power ports, the total power demand can be computed. In other embodiments, the total power demand can also be estimated based on the instantaneous power supplied to the power ports.

Figure 2:
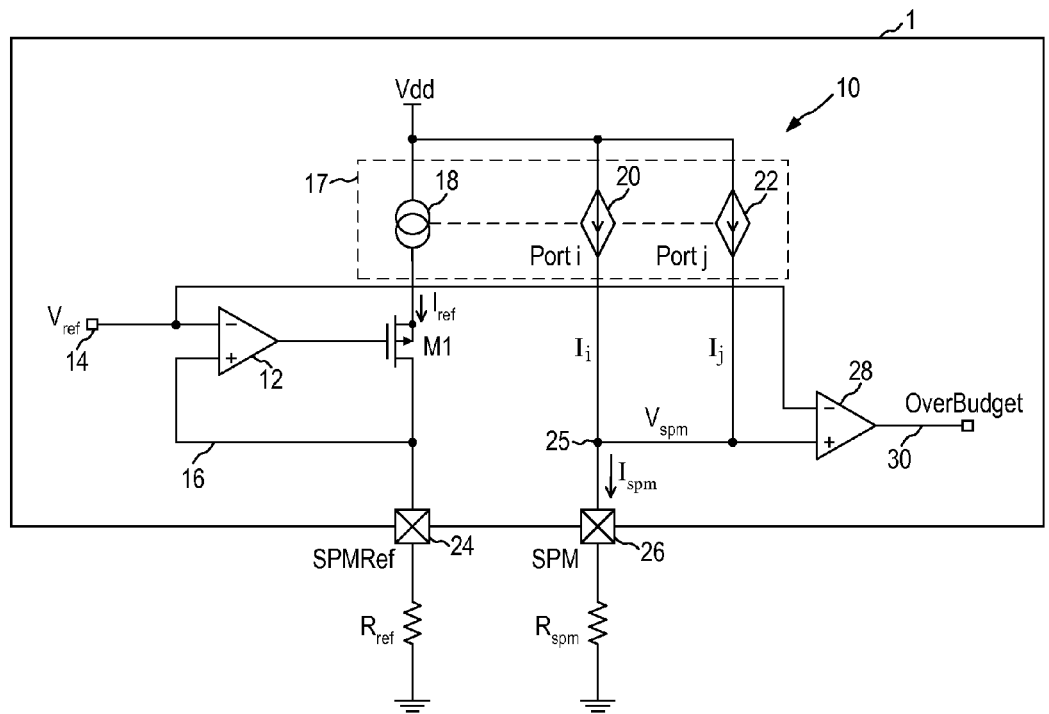
FIG. 2 is a schematic diagram of a power budget monitoring circuit incorporated in a PSE according to one embodiment of the present invention.

FIG. 2 is a schematic diagram of a power budget monitoring circuit incorporated in a PSE according to one embodiment of the present invention. Referring to FIG. 2, a power budget monitoring circuit 10 in a PSE 1 includes a SPMRef terminal 24 for receiving a reference resistor $R_{ref}$ and a SPM terminal 26 for receiving a monitor resistor $R_{spm}$. In one embodiment, PSE 1 is implemented as an integrated circuit and SPMRef terminal 24 and SPM terminal 26 are I/O pin of the integrated circuit of PSE 1. Reference resistor $R_{ref}$ and monitor resistor $R_{spm}$ are therefore off-chip resistors external to the integrated circuit of PSE 1. Off-chip resistors have advantages over on-chip resistors because off-chip resistors generally have more precise resistance values.

Power budget monitoring circuit 10 in PSE 1 provides a first current to resistor $R_{ref}$ through SPMRef terminal 24 and a second current to resistor $R_{spm}$ through SPM terminal 26 and measures the voltage developed across resistor $R_{spm}$. Power budget monitoring circuit 10 generates output signal OverBudget (node 30) indicative of the power demand of PSE 1. Output signal OverBudget is asserted when the power drawn or to be drawn by the powered devices connected thereto exceeds the allowable power budget of the PSE. PSE 1 includes control circuitry (not shown) for receiving the OverBudget signal and determining whether power will be provided to one or more of its power ports (not shown) based on the value of the OverBudget signal.

Power budget monitoring circuit 10 includes a differential amplifier 12 and a PMOS transistor M1 connected in a unity gain configuration. Differential amplifier 12 includes an inverting input terminal (node 14) receiving a reference voltage $V_{ref}$ and a non-inverting input terminal (node 16) coupled to the SPMRef terminal 24. The output terminal of differential amplifier 12 is coupled to the gate terminal of PMOS transistor M1. The source terminal of PMOS transistor M1 is coupled to a current mirror input device 18. The drain terminal of PMOS transistor M1 is connected to SPMRef terminal 24 which is also connected to the non-inverting input terminal (node 16) of differential amplifier 12, forming a feedback loop.

The operation of differential amplifier 12 and PMOS transistor M1 is such that the reference voltage $V_{ref}$ is forced across reference resistor $R_{ref}$ through SPMRef terminal 24 to establish a reference current $I_{ref}$ at the source terminal of transistor M1. More specifically, the reference voltage $V_{ref}$ and the resistance of resistor $R_{ref}$ are selected so that the reference voltage $V_{ref}$ imposed across the reference resistor $R_{ref}$ yields a given reference current $I_{ref}$ being used to represent a unit of load power (or load current). In one embodiment, a resistance value for reference resistor $R_{ref}$ and a reference voltage value are selected so that the reference current $I_{ref}$ is at 10 μA for representing 1 watt of power. Thus, the reference current $I_{ref}$ has a representative value of 10 μA/watt. In the present embodiment, resistor $R_{ref}$ is an off-chip resistor with high precision resistance value so as to establish an accurate reference current.

The reference current $I_{ref}$ is provided to a current mirror 17 formed by current mirror input device 18 and current mirror output devices 20 and 22. Current mirror output devices 20 and 22 function as variable current sources for mirroring the reference current $I_{ref}$ from current mirror input device 18 and generating output currents being proportional to the reference current $I_{ref}$ and control signals provided thereto. In the present description, current mirror output devices 20 and 22 will be referred to as "variable current sources" but it is understood that the variable current sources 20 and 22 mirror the reference current $I_{ref}$ and generate output currents as a function of the reference current $I_{ref}$ and control signals coupled to each variable current source. Alternately, current mirror 17 can be viewed as having a current mirror input terminal receiving the reference current $I_{ref}$ and multiple current mirror output terminals providing variable output currents that are mirrored from and proportional to the reference current $I_{ref}$.

Power budget monitoring circuit 10 includes multiple variable current sources where one variable current source is associated with each of the power ports of the PSE 1. For instance, in circuit 10, variable current source 20 is provided for a power port i of PSE 1 and a variable current source 22 is provided for a power port j of PSE 1. Additional variable current sources are provided for all the power ports of PSE 1 and only two variable current sources are shown in FIG. 2 for simplicity. Variable current sources 20 and 22 provide output currents $I_i$ and $I_j$, respectively, that are mirrored from the reference current $I_{ref}$. Because each variable current source 20, 22 mirrors the reference current $I_{ref}$, each variable current source thus tracks the variations, if any, in the reference current, thereby increasing monitoring accuracy.

The currents $I_i$ and $I_j$ provided by all of the variable current sources 20, 22 are summed together at a node 25. In power budget monitoring circuit 10, the currents are summed together using an analog bus. The summed current is then forced into monitor resistor $R_{spm}$ through SPM terminal 26.

As thus configured, each of variable current sources 20, 22 provide an output current that is a function of the reference current $I_{ref}$ which is set to represent a unit of load current (μA per watts). Furthermore, in the present embodiment, the value of each variable current source 20, 22 is set in direct proportion to the maximum load power (or load current) that its corresponding port is allowed to provide to the powered device based on the classification of the powered device. For example, if a class 2 powered device is coupled to power port i, then the maximum power allowed to be supplied to port i is 7 watts. Then, variable current source 20 will provide a current that is 7 times the reference current $I_{ref}$, that is, 70 uA, because the reference current delivers 10 uA/watt. Variable current source 22 provides a current $I_j$ that is proportional to the maximum allowed power for power port j. The variable current sources 20, 22 are set by control signals to provide the current corresponding to the maximum allowed power of the associated ports. The control signals are not shown in FIG. 2 but will be described in more details in FIG. 3 below.

The value of resistor $R_{spm}$ is selected such that it establishes the total power (or current) budget for all the power ports of PSE 1 combined. The power budget $P_{budget}$ and the current budget $I_{budget}$ are given as follows:

$$P_{budget} = \frac{R_{ref}}{R_{spm}} P_{unit} \text{ or } I_{budget} = \frac{R_{ref}}{R_{spm}} I_{unit},$$

where $I_{unit}$ refers to the unit current or the current representing one unit power which is the reference current $I_{ref}$. Thus, for a given power budget $P_{budget}$, resistor $R_{ref}$ and resistor $R_{spm}$ should have a resistance ratio of 100:1. That is, resistor $R_{spm}$ should be $(1/P_{budget})*R_{ref}$ and $P_{budget}$ is 100 watts.

For example, if the total power budget $P_{budget}$ for PSE 1 is 100 watts, then resistor $R_{ref}$ and resistor $R_{spm}$ should have a resistance ratio of 100:1. That is, resistor $R_{spm}$ should be 1/100 times resistor $R_{ref}$. If the power budget $P_{budget}$ is 50 watts, the resistor $R_{ref}/R_{spm}$ ratio is 50 and resistor $R_{spm}$ is 1/50 times the reference resistor $R_{ref}$.

In essence, the ratio of resistors $R_{spm}$ and $R_{ref}$ establishes the maximum power budget of the PSE 1. In one embodiment, resistor $R_{ref}$ is preselected for the power budget monitoring circuit 10 and resistor $R_{spm}$ is then chosen based on the maximum power budget of the PSE. For example, when the maximum power budget for PSE 1 is 100 watts, then a resistor $R_{spm}$ 1/100 times the reference resistor $R_{ref}$ is used. After the resistor $R_{spm}$ is selected to set the maximum power budget, then power budget monitoring circuit 10 can then proceed with monitoring and detecting when the total power demand from the power ports exceeds the maximum power budget.

Variable current sources 20, 22 generate currents $I_i$ and $I_j$ indicative of the power demand from the power ports i and j. The currents are summed at node 25 and provided to SPM terminal 26 as a current $I_{spm}$ indicative of the total power demand from the power ports of PSE 1. Current $I_{spm}$ is forced across resistor $R_{spm}$ to develop a voltage $V_{spm}$ across resistor $R_{spm}$. Voltage $V_{spm}$ at node 25 is indicative of the total power or current demand of the power ports of PSE 1.

By using resistor $R_{spm}$ that is $1/P_{budget}$ of reference resistor $R_{ref}$ and by using currents $I_i$, $I_j$ that are mirrored from and multiples of the reference currents $I_{ref}$, voltage $V_{spm}$ is thus scaled by the power budget of the PSE such that voltage $V_{spm}$ has a voltage value that increases toward the reference voltage $V_{ref}$ with increasing current $I_{spm}$, representing an increasing current or power demand. When the summed current $I_{spm}$ reaches the maximum current budget, voltage $V_{spm}$ will have a voltage value equal to the reference voltage $V_{ref}$. More specifically, voltage $V_{spm}$ is given as:

$$V_{spm} = I_{spm} \times R_{spm} = P_{demand} I_{ref} \times \left(\frac{1}{P_{budget}}\right) R_{ref},$$

where $P_{demand}$ denotes the total current demand from the power ports of PSE 1 and is a multiplication factor of the reference current $I_{ref}$. When power demand $P_{demand}$ approaches the power budget Pbudget, voltage $V_{spm}$ approaches the reference voltage $V_{ref} = I_{ref} \times R_{ref}$.

For example, for a 100-watt PSE system, resistor $R_{spm}$ is 1/100 times reference resistor $R_{ref}$. Then, each variable current source 20, 22 provides currents $I_i$ and $I_j$ that are multiples of the reference current $I_{ref}$. Currents $I_i$ and $I_j$ sum up to current $I_{spm}$. If current $I_{spm}$ is 50 times the reference current $I_{ref}$, then voltage $V_{spm}$ would be 50/100 Vref or 0.5 Vref, indicating that the total current or power demand from all of the power ports is only one half of the maximum allowable power of PSE 1. If and when current $I_{spm}$ reaches 100 times the reference current Iref, then voltage $V_{spm}$ reaches the reference voltage $V_{ref}$, indicating that the current or power demand has reached the maximum allowable amount for the PSE.

In power budget monitoring circuit 10, voltage $V_{spm}$ is compared to the reference voltage $V_{Ref}$ at a comparator 28. More specifically, comparator 28 has an inverting input terminal receiving the reference voltage $V_{Ref}$ and a non-inverting input terminal coupled to SPM terminal 26 to receive the voltage $V_{spm}$. Comparator 28 generates an output signal on node 30 being the OverBudget signal. OverBudget has a first state when voltage $V_{spm}$ is less than the reference voltage $V_{ref}$ and a second state when voltage $V_{spm}$ is greater than the reference voltage $V_{ref}$.

In operation, power budget monitoring circuit 10 is configured for a given power budget by selecting a resistance value of resistor $R_{spm}$ that is $1/P_{budget}$ of the reference resistor $R_{ref}$. Each variable current source is programmed to provide a current proportional to the allowed power for the associated power port. As each power port demands power, the associated variable current source is turned on and contributes a portion of current forming current $I_{spm}$. As more and more power ports are turned on, more and more current from the variable current sources contribute to current $I_{spm}$ and current $I_{spm}$ increases. Voltage $V_{spm}$ increases accordingly and is compared to the reference voltage $V_{ref}$. When voltage $V_{spm}$ increases beyond the reference voltage $V_{ref}$, the OverBudget signal is asserted to indicate to PSE 1 that the additional power demand exceeds the maximum power budget of the system. PSE 1 monitors the OverBudget signal to determine if power should be provided to a power port demanding power.

Figure 3:
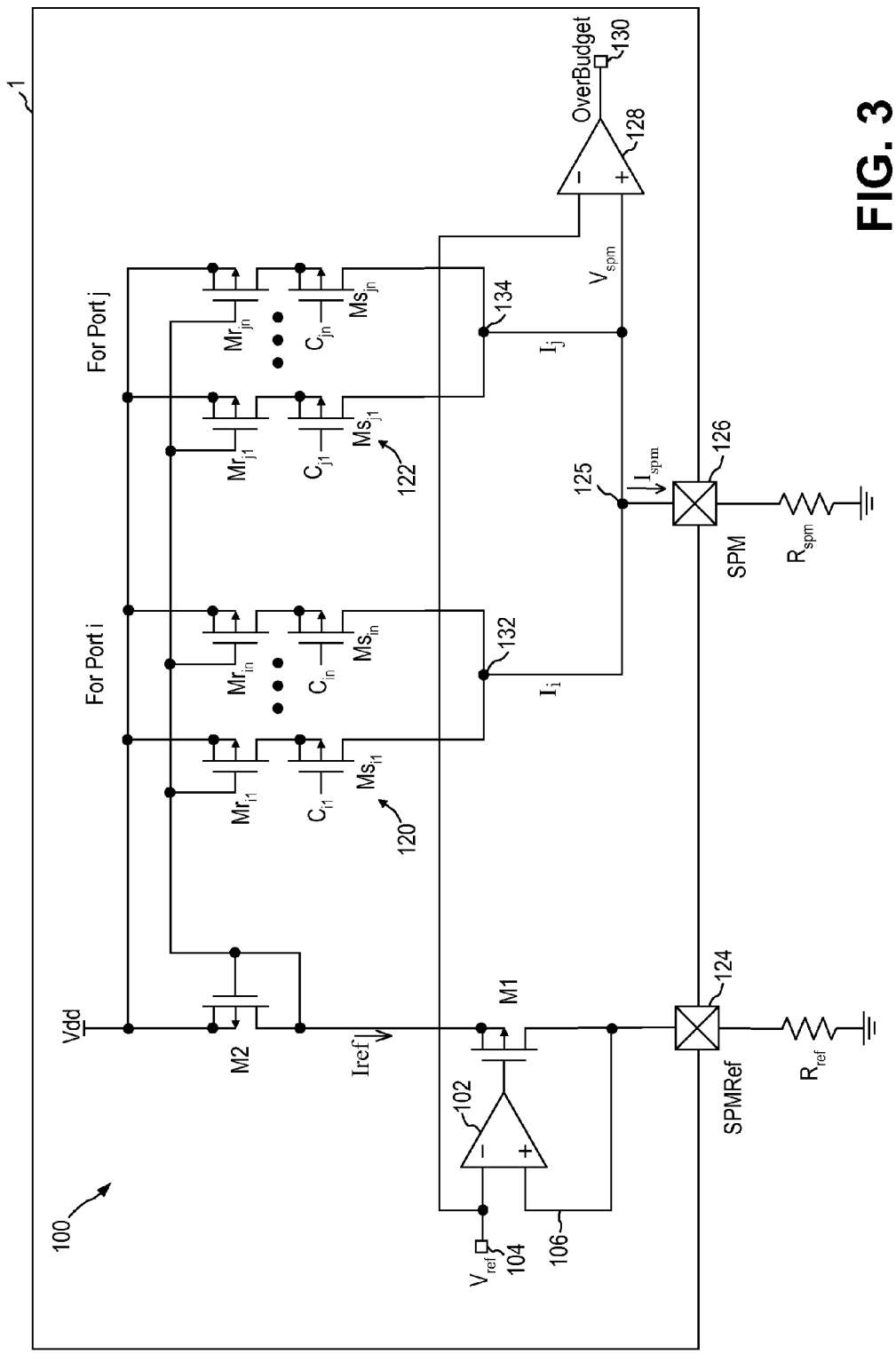
FIG. 3 is a transistor level schematic diagram of the power budget monitoring circuit according to one embodiment of the present invention.

FIG. 3 is a transistor level schematic diagram of the power budget monitoring circuit according to one embodiment of the present invention. Referring to FIG. 3, power budget monitoring circuit 100 includes a PMOS transistor M2 forming the current mirror input device receiving reference current $I_{ref}$. The current mirror output devices or variable current sources 120, 122 are formed using banks of serially connected transistor pairs with one transistor in the pair forming a current mirror with transistor M2 and the other one being the control transistor. The control transistors in the bank are selectively turned on to enable one or more of the current mirror transistors so that each variable current source provides an output current indicative of the maximum load power or maximum load current for the associated power port.

More specifically, for power port I, variable current source 120 includes a bank of "n" number of serially connected transistor pairs. In the present illustration, the first and last transistor pairs are shown but it is understood that the variable current source can include one or more of the transistor pairs forming the bank of serially connected transistor pairs. Each serially connected transistor pair includes a current mirror transistor (denoted "$Mr_{ix}$", where x is from 1 to n) and a control transistor (denoted "$Ms_{ix}$", where x is from 1 to n). Each pair of current mirror transistor and control transistor are connected in series between the power supply voltage Vdd and a current source output node 132. The current provided by each transistor pair is summed at the current source output node 132 to generate the variable current source output current $I_i$.

The current mirror transistor $Mr_{ix}$ is a PMOS transistor and has its gate terminal connected to the gate terminal of reference current transistor M2 and its source terminal connected to the power supply voltage Vdd. Thus, current mirror transistor $Mr_{ix}$ mirrors the reference current $I_{ref}$ flowing in transistor M2 based on the width/length ratios of transistors M2 and $Mr_{ix}$. Thus, current mirror transistor $Mr_{ix}$ mirrors a current that is proportional to the reference current $I_{ref}$. The control transistor $Ms_{ix}$ receives a control signal $C_{ix}$ (where x is from 1 to n) at its gate terminal and is either turned on to allow the current mirror transistor $Mr_{ix}$ to pass the mirrored reference current or turned off to disable the specific transistor pair. When power port i is not enabled, all of the control transistors $Ms_{i1}$ to $Ms_{in}$ are turned off of course so that current $I_i$ does not contribute anything to the total current $I_{spm}$. When power port i is enabled and is demanding power, control signals $C_{i1}$ to $C_{in}$ are activated. Through the control signals $C_{i1}$ to $C_{in}$, one or more of control transistors $Ms_{i1}$ to $Ms_{in}$ are turned on to pass the mirrored currents from the associated current mirror transistors $Mr_{i1}$ to $Mr_{in}$. By selectively turning on one or more of the control transistors $Ms_{i1}$ to $Ms_{in}$, output current $I_i$ being indicative of the maximum load current or power of power port i is generated. Output current $I_i$, being mirrored from the reference current $I_{ref}$, is a multiple of the reference current $I_{ref}$.

The variable current source 122 for power port j is constructed in the same manner as variable current source 120 for power port i. Current mirror transistors $Mr_{j1}$ to $Mr_{jn}$ are configured to mirror the reference current from transistor M2. Control transistors $Ms_{j1}$ to $Ms_{jn}$, controlled by control signals $C_{j1}$ to $C_{jn}$, are selectively turned on to pass the mirrored currents from current mirror transistors $Mr_{j1}$ to $Mr_{jn}$. In this manner, a current $I_j$, indicative of the maximum load current or power of power port j, is generated at current output node 134.

In the present embodiment, variable current sources 120, 122 generate output currents that are quantized as a function of the reference current $I_{ref}$. FIG. 3 illustrates one embodiment of variable current sources 120, 122 and the embodiment shown in FIG. 3 is illustrative only. Other circuitry for implementing variable current sources 120, 122 to generate output currents $I_i$ and $I_j$ under the control of control signals can also be used in other embodiments of the present invention. Furthermore, in FIG. 3, two variable current sources are shown for the two power ports i and j. It is understood that the embodiment shown in FIG. 3 is illustrative only and power budget monitoring circuit 100 includes a variable current source for each power port. Thus, power budget monitoring circuit 10 can include two or more variable current sources depending on the number of power ports of the PSE.

In the above-described embodiment, each of the variable current sources provides an output current that is indicative of the maximum load power/load current allowed for the associated power port based on the classification of the powered device connected to the power port. In an alternate embodiment, the variable current sources provide output currents that are proportional to the instantaneous power (or current) that is being supplied to the corresponding power port. For example, when a class 2 powered device with a maximum load power of 7 watts is connected to port i, variable current source 20 (FIG. 2) provides an output current $I_i$ being 7 times the reference current $I_{ref}$ in the above-described embodiment. However, in the alternate embodiment, variable current source 20 provides an output current that is indicative of the instantaneous power or current of power port i. Therefore, if power port i is only sourcing 3 watts, variable current source 20 will provide an output current $I_i$ that is only 3 times the reference current $I_{ref}$ in the alternate embodiment of the present invention.

In one embodiment of the present invention, the power budget monitoring circuit makes an a priori determination of the power budget status before power is provided to the power port. When a power port demands power, the power budget monitoring circuit determines beforehand if enabling power to the power port would put the PSE system over the maximum allowable power (or current) budget. The power budget monitoring circuit thus allows a decision to be made as to whether or not to power up the power port requested power. In operation, when a power port demands power, before power is actually supplied to the power port, the variable current source associated with that power port is turned on and the status of the OverBudget signal is examined. If the OverBudget signal is not asserted with the increased current contribution from the variable current source of the requesting power port, then power can be supplied to the requested power port. If the OverBudget signal is asserted indicating that the maximum power budget would be exceeded by supplying power to the requesting power port, then the PSE system can decide not to power up that power port at all and the associated variable current source is turned off.

According to an alternate embodiment of the present invention, each time a power port demands power, the power is supplied to the power port while the power budget monitoring circuit of the present invention operates to determine if the total power budget is exceeded. That is, each time a power port demands power, the power is supplied to the power port while the variable current source associated with the power port is activated to supply a portion of the current to be summed into current $I_{spm}$. When the increasing current value of current $I_{spm}$ causes the voltage $V_{spm}$ to exceed the reference voltage $V_{ref}$, the OverBudget signal is asserted to alert control circuitry in PSE 1 that the maximum power budget has been exceeded. PSE 1 can then act to terminate the power supply to the power port.

A salient feature of the power budget monitoring circuit of the present invention is that the power budget monitoring circuit is configured to monitor the power budget for multiple power ports. That is, a power budget monitoring circuit of the present invention is configured to manage the power budget of two or more power ports of a PSE. In this manner, the power budget management of a PSE is greatly simplified by not requiring the use of a monitoring circuit for each power port of a PSE. For example, in a PSE including 8 power ports, one power budget monitoring circuit is needed where currents from 8 variable current sources are summed together to form a single current $I_{spm}$. A single comparator is used to provide an OverBudget for all 8 power ports of the PSE.

Figure 4:
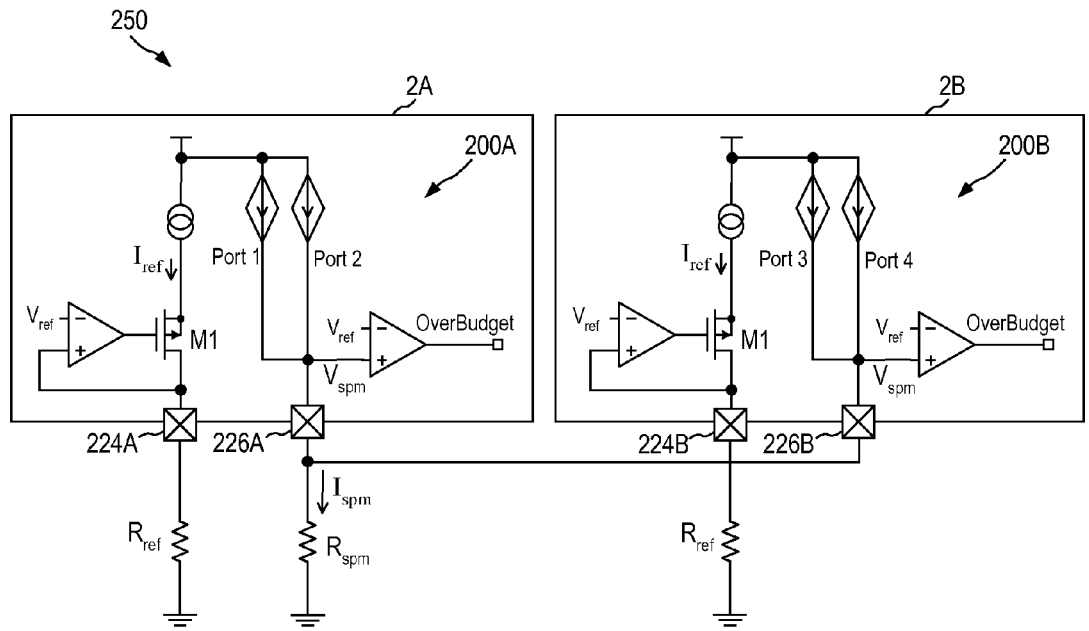
FIG. 4 is a schematic diagram of a PoE system incorporating multiple PSEs and interconnected power budget monitoring circuits according to one embodiment of the present invention.

According to another aspect of the present invention, the power budget monitoring circuits of two or more PSE integrated circuits are interconnected to allow power budget monitoring of a PoE system formed by multiple PSE integrated circuits. FIG. 4 is a schematic diagram of a PoE system incorporating multiple PSEs and interconnected power budget monitoring circuits according to one embodiment of the present invention. Referring to FIG. 4, a PoE system 250 includes a PSE 2A and a PSE 2B each formed as an integrated circuit. Each of PSEs 2A, 2B includes a power budget monitoring circuit 200A, 200B for monitoring two or more power ports on each PSE. To implement power budget monitoring for the PoE system 250, the SPM terminals 226A and 226B of power budget monitoring circuit 200A and 200B are connected together and to a single monitoring resistor $R_{spm}$. Each of power budget monitoring circuits 200A, 200B uses its own reference resistor $R_{ref}$ to set the current indicative of a unit power. Thus, PoE system 250 uses a reference resistor $R_{ref}$ for each PSE but only one monitoring resistor $R_{spm}$ for the entire system.

The resistance value for resistor $R_{spm}$ is selected to represent the total power budget of the PoE system 250. In operation, the variable current sources associated with power ports 1 and 2 of PSE 200A contribute currents to the total current $I_{spm}$ based on the power demand at the power ports 1, 2. Meanwhile, the variable current sources associated with power ports 3 and 4 of PSE 200B contribute currents to the total current $I_{spm}$ based on the power demand at the power ports 3, 4. Current $I_{spm}$ is forced across resistor $R_{spm}$ to generate a voltage $V_{spm}$ at the SPM terminals 226A, 226B of all the PSE devices 200A, 200B. Each PSE device can then generate its own OverBudget signal by comparing the same global voltage $V_{spm}$ to the reference voltage $V_{ref}$. The reference voltage $V_{ref}$ is locally generated at each PSE and thus there may be small errors in the reference voltages between each PSE. The small errors in the reference voltages will not impact the operation of power budget monitoring circuits.

In one embodiment, a PoE system includes four PSE devices each including eight power ports. The PoE system thus has 32 power ports. Instead of providing a power management circuit for each of the 32 power ports, the power budget monitoring circuit is implemented in each PSE device to enable the monitoring of eight power ports. Thus, only four power budget monitoring circuit is required to monitoring the entire PoE system with 32 ports. A single monitoring resistor $R_{spm}$ is used while separate reference resistors are used for each PSE device.

The above detailed descriptions are provided to illustrate specific embodiments of the present invention and are not intended to be limiting. Numerous modifications and variations within the scope of the present invention are possible. The present invention is defined by the appended claims.

We claim:

1. A power budget monitoring circuit in a power sourcing equipment (PSE) for a Power over Ethernet system, the PSE including multiple power ports, the power budget monitoring circuit comprising:

a differential amplifier having an inverting input terminal coupled to receive a reference voltage, an non-inverting input terminal coupled to a first node and an output terminal;

a first transistor having a control terminal coupled to the output terminal of the differential amplifier, a first current handling terminal coupled to an input terminal of a current mirror and a second current handling terminal coupled to the first node;

a first resistor coupled between the first node and a ground voltage and having a first resistance value, wherein the differential amplifier and the first transistor force a voltage equaling the reference voltage across the first resistor to establish a reference current as a function of the reference voltage across the first resistor and the first resistance of the first resistor, the reference current being indicative of a current value per unit power and being provided to a current mirror input device of the current mirror;

a plurality of current mirror output devices in the current mirror functioning as variable current sources, each current mirror output device being associated with a power port of the PSE, each current mirror output device providing an output current indicative of the power demanded by the associated power port, the output currents from the plurality of the current mirror output devices being summed at a second node into a monitor current;

a second resistor coupled between the second node and the ground voltage and having a second resistance value proportional to a maximum power budget of the PSE, wherein the second resistor receives the monitor current and a monitor voltage develops across the second resistor being indicative of a total power demanded by the power ports of the PSE; and a comparator comparing the monitor voltage to the reference voltage, the comparator providing a comparator output signal having a first state indicating that the total power demanded by the power ports does not exceed the maximum power budget of the PSE and a second state indicating that the total power demanded by the power ports has exceeded the maximum power budget of the PSE.

2. The power budget monitoring circuit of claim 1, wherein the power budget of the PSE comprises the current budget of the PSE and the monitor voltage developed across the second resistor is indicative of the total current demanded by the power ports of the PSE.

3. The power budget monitoring circuit of claim 1, wherein the second resistance of the second resistor is $(1/P_{budget})$ times the first resistance, where $P_{budget}$ denotes the maximum power budget of the PSE.

4. The power budget monitoring circuit of claim 1, wherein each of the plurality of current mirror output devices provides an output current that is mirrored from and proportional to the reference current.

5. The power budget monitoring circuit of claim 4, wherein each of the plurality of current mirror output devices provides an output current that is indicative of the maximum load power that the associated power port is allowed to provide to a powered device connected thereto.

6. The power budget monitoring circuit of claim 5, wherein the PSE is an IEEE Standard 802.3-2005 compliant PSE and the maximum load power is determined based on the classification of the powered device under IEEE Standard 802.3-2005, Clause 33.

7. The power budget monitoring circuit of claim 4, wherein each of the plurality of current mirror output devices provides an output current that is indicative of the instantaneous power supplied to the associated power port.

8. The power budget monitoring circuit of claim 1, wherein the first transistor comprises a first PMOS transistor having a gate terminal coupled to the output terminal of the differential amplifier, a source terminal coupled to the input terminal of the current mirror and a drain terminal coupled to the first node.

9. The power budget monitoring circuit of claim 8, wherein the first current source comprises a second PMOS transistor having a gate terminal and a drain terminal connected together and to the source terminal of the first PMOS transistor, and a source terminal connected to a positive power supply voltage.

10. The power budget monitoring circuit of claim 9, wherein each of the plurality of current mirror output devices comprises:
a plurality of serially connected transistor pairs connected in parallel between the positive power supply voltage and an output current node providing the output current, each serially connected transistor pair comprising a current mirror transistor configured to mirror the current flowing in the second PMOS transistor and a control transistor receiving a respective control signal at a gate terminal,
wherein one or more control transistors in the plurality of serially connected transistor pairs are selectively turned on to pass the current mirrored by the associated current mirror transistors to the output current node.

11. The power budget monitoring circuit of claim 10, wherein each serially connected transistor pair comprises:
a third PMOS transistor having a gate terminal connected to the gate terminal of the second PMOS transistor, a source terminal connected to the positive power supply voltage and a drain terminal; and
a fourth PMOS transistor having a gate terminal receiving the respective control signal, a source terminal connected to the drain terminal of the third PMOS transistor and a drain terminal connected to the current output node.

12. The power budget monitoring circuit of claim 1, wherein the PSE is formed as a single integrated circuit and the first resistor and the second resistor comprise off-chip resistors external to the integrated circuit of the PSE.

13. A Power over Ethernet (PoE) system including first and second power sourcing equipments (PSEs), each PSE including multiple power ports and a power budget monitoring circuit comprising:
a differential amplifier having an inverting input terminal coupled to receive a reference voltage, an non-inverting input terminal coupled to a first node and an output terminal;
a first transistor having a control terminal coupled to the output terminal of the differential amplifier, a first current handling terminal coupled to an input terminal of a current mirror and a second current handling terminal coupled to the first node;
a first resistor coupled between the first node and a ground voltage and having a first resistance value, wherein the differential amplifier and the first transistor force a voltage equaling the reference voltage across the first resistor to establish a reference current as a function of the reference voltage across the first resistor and the first resistance of the first resistor, the reference current being indicative of a current value per unit power and being provided to a current mirror input device of the current mirror;
a plurality of current mirror output devices in the current mirror functioning as variable current sources, each current mirror output device being associated with a power port of the respective PSE, each current mirror output device providing an output current indicative of the power demanded by the associated power port, the output currents from the plurality of the current mirror output devices being summed at a second node into a monitor current; and
a comparator comparing a monitor voltage at the second node to the reference voltage, the comparator providing a comparator output signal,
wherein the power budget monitoring circuit of the first PSE further comprises a second resistor coupled between the second node and the ground voltage and having a second resistance value proportional to a maximum power budget of the PoE system; and the second node of the power budget monitoring circuit of the second PSE is connected to the second node of the power budget monitoring circuit of the first PSE; and
the second resistor receives the monitor current from the power budget monitoring circuits of the first and second PSEs and the monitor voltage develops across the second resistor indicative of a total power demanded by the power ports of the first and second PSEs of the PoE system; and
the comparator output signal has a first state indicating that the total power demanded by the power ports of the first and second PSEs does not exceed the maximum power budget of the PoE system and a second state indicating that the total power demanded by the power ports of the first and second PSEs has exceeded the maximum power budget of the PoE system.

14. The Power over Ethernet (PoE) system of claim 13, wherein the second resistance of the second resistor is $(1/P_{budget})$ times the first resistance, where $P_{budget}$ denotes the maximum power budget of the PoE system.

15. The Power over Ethernet (PoE) system of claim 13, wherein each of the plurality of current mirror output devices in the power budget monitoring circuit provides an output current that is mirrored from and proportional to the reference current.

16. The Power over Ethernet (PoE) system of claim 15, wherein each of the plurality of current mirror output devices provides an output current that is indicative of the maximum load power that the associated power port is allowed to provide to a powered device connected thereto.

17. The Power over Ethernet (PoE) system of claim 16, wherein the first and second PSEs are IEEE Standard 802.3-2005 compliant PSEs and the maximum load power is determined based on the classification of the powered device under IEEE Standard 802.3-2005, Clause 33.

18. The Power over Ethernet (PoE) system of claim 15, wherein each of the plurality of current mirror output devices provides an output current that is indicative of the instantaneous power supplied to the associated power port.

19. The Power over Ethernet (PoE) system of claim 13, wherein each of the first and second PSEs is formed as a single integrated circuit and the first resistors of the first and second PSEs and the second resistor of the first PSE comprise off-chip resistors external to the integrated circuit of the PSEs.

* * * * *